Patented Nov. 12, 1929

1,735,074

UNITED STATES PATENT OFFICE

FRANK W. DAVIS, OF MILFORD, DELAWARE, ASSIGNOR TO SAMUEL G. ALLEN, TRUSTEE

ART OF MAKING STEEL

No Drawing. Application filed June 2, 1924. Serial No. 717,280.

This invention relates to a process for making steel and it has for one of its primary objects the obtaining of the advantages of the electric furnace method in a pyro-metallurgical process for making steel.

The advantages of the electric furnace method and the superior properties of electric furnace steel are attributable, in the main, to the fact that the steel is finished under a reducing atmosphere and under a reducing slag, which makes possible the elimination of the oxides included in the steel in greater degree than is possible in the open hearth practice.

In carrying out my invention I follow the usual procedure in open hearth furnace practice until the sulphur or other impurity elimination has reached the desired degree, the sulphur going into the slag. I propose to remove this sulphur bearing slag but, either immediately before I remove such slag or coincident with the removal thereof, I cut off the air which has therefore been supplied with the oil or other fuel in the usual manner, and make a change in the combustion by admitting oxygen, preferably in an amount just sufficient to give, with an excess of fuel, the desired flame temperature and a neutral, non-oxidizing or slightly reducing atmosphere. I then introduce slag forming material such as lime and sand, or other material which will produce a non-oxidizing or a reducing slag. When the lime and sand have been melted I introduce a reducing agent such as coke. It will, of course, be understood that the fuel and the oxygen, as above described, are admitted until such time as the steel has been properly purified.

As a result of the foregoing the steel is finished under a neutral or non-oxidizing or reducing atmosphere and under a neutral, non-oxidizing or reducing slag and under conditions approaching those in the electric furnace. The resultant product is therefore much cleaner and better in quality than that which is made in the present open hearth practice and closely approximates electric furnace steel.

This improved process avoids some of the difficulties incident to electric furnace practice and particularly the burning of the steel which is so liable to occur in the electric furnace, wherein the results obtained are very largely directly proportional to the skill of the operator.

The use of fuel in excess ensures the taking up of all of the supporter of combustion supplied, facilitates the formation and maintenance of a neutral, non-oxidizing or reducing slag, and the excess itself introduces no difficulties.

I claim:

1. In the making of steel by the open hearth process, the steps of the cessation of the usual combustion and the removal of the slag normally produced, and the completion of the operation under combustion of fuel non-productive of an oxidizing flame.

2. In the making of steel by the open hearth process, the steps of the cessation of the usual combustion and the removal of the slag normally produced, and the completion of the operation under combustion of fuel non-productive of an oxidizing flame and under a non-oxidizing slag.

3. In the making of steel by the open hearth process, the finishing of the steel under a non-oxidizing atmosphere produced by employing gaseous oxygen as the supporter of combustion and utilizing fuel in excess amounts.

4. In the making of steel by the open hearth process, the steps of the removal of the first slag, the cutting off of the air theretofore supplied with the fuel, the admission of oxygen with an excess of fuel, the introduction of a second slag, and the introduction of a reducing agent.

5. In the making of steel by the open hearth process, the steps of the removal of the first slag, the cutting off of the air theretofore supplied with the fuel, the admission of oxygen with an excess of fuel, and the introduction of a non-oxidizing or reducing slag.

6. In the making of steel by the open hearth process, the steps of the cessation of the usual combustion, the removal of the slag normally produced, and the completion of the operation with oxygen and an excess of fuel.

7. In the making of steel by the open hearth process, the steps of the cessation of the usual combustion and the completion of the operation with oxygen and an excess of fuel.

8. In the making of steel by the open hearth process, the steps of the cessation of the usual combustion and the removal of the slag normally produced, and the completion of the operation under combustion of fuel nonproductive of an oxidizing flame and under a reducing slag.

In testimony whereof, I have hereunto signed my name.

FRANK W. DAVIS.